United States Patent
Takii et al.

(10) Patent No.: US 10,723,386 B2
(45) Date of Patent: Jul. 28, 2020

(54) VEHICLE SIDE SECTION STRUCTURE

(71) Applicant: TOYOTA JIDOSHA KABUSHIKI KAISHA, Toyota-shi (JP)

(72) Inventors: Shunsuke Takii, Aichi-gun (JP); Kazuki Shimizu, Kariya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 52 days.

(21) Appl. No.: 16/034,956

(22) Filed: Jul. 13, 2018

(65) Prior Publication Data

US 2019/0031242 A1 Jan. 31, 2019

(30) Foreign Application Priority Data

Jul. 26, 2017 (JP) ................... 2017-144708
Dec. 27, 2017 (JP) ................... 2017-251909

(51) Int. Cl.
| | | |
|---|---|---|
| B62D 25/02 | (2006.01) | |
| B62D 25/04 | (2006.01) | |
| B62D 25/06 | (2006.01) | |
| B62D 25/24 | (2006.01) | |
| B60J 10/80 | (2016.01) | |

(52) U.S. Cl.
CPC .............. *B62D 25/02* (2013.01); *B60J 10/80* (2016.02); *B62D 25/04* (2013.01); *B62D 25/06* (2013.01); *B62D 25/24* (2013.01)

(58) Field of Classification Search
CPC .......... B60J 10/80; B62D 25/04; B62D 25/06; B62D 25/24; B62D 25/02
See application file for complete search history.

(56) References Cited

U.S. PATENT DOCUMENTS

| | | |
|---|---|---|
| 2004/0189053 A1 | 9/2004 | Zummallen et al. |
| 2006/0237996 A1 | 10/2006 | Eipper et al. |
| 2014/0152053 A1 | 6/2014 | Watanabe et al. |

FOREIGN PATENT DOCUMENTS

| | | |
|---|---|---|
| EP | 2 631 158 A1 | 8/2013 |
| JP | 2001-334957 | 12/2001 |
| JP | 2004-276747 | 10/2004 |
| JP | 2005-537179 | 12/2005 |
| JP | 5712291 | 5/2015 |
| WO | WO 2016/051867 A1 | 4/2016 |

*Primary Examiner* — D Glenn Dayoan
*Assistant Examiner* — Melissa Ann Bonifazi
(74) *Attorney, Agent, or Firm* — Oblon, McClelland, Maier & Neustadt, L.L.P.

(57) ABSTRACT

There is provided a vehicle side section structure including: a plurality of framework members that are disposed in a vehicle side section and that have closed cross-sections; side outer panels that are molded independently from the framework members, and that cover the framework members from a vehicle width direction outer side; a door opening configured by the plurality of the framework members; a side door that is provided at the door opening so as to be capable of opening and closing; and a sealing member that plugs a gap between the door opening and the side door; the side outer panels surrounding the door opening, and being configured from a plurality of panels including an opening panel that bears elastic force from the sealing member when the side door is in a closed state.

7 Claims, 8 Drawing Sheets

VEHICLE SIDE SECTION STRUCTURE

CROSS-REFERENCE TO RELATED APPLICATION

This application is based on and claims priority under 35 USC 119 from Japanese Patent Application No. 2017-144708 filed on Jul. 26, 2017 and Japanese Patent Application No. 2017-251909 filed on Dec. 27, 2017, which are incorporated by reference herein.

BACKGROUND

Technical Field

The present disclosure relates to a vehicle side section structure.

Related Art

Japanese National-Phase Publication No. 2005-537179 discloses a body structure in which a roof module that includes front and rear roof columns (pillars) is placed on and is connected to a base module that includes column sections, these being a pillar floor section. The front and rear roof columns of the roof module are connected to one another by a respective cross member.

Here, framework members are connected by adhesion or welding. For example, at the front pillars in the above body structure, the column sections extending from the base module toward the upper side of the vehicle, and the cross member extending along a vehicle width direction, are respectively fixed to the front roof columns using adhesion or welding.

SUMMARY

However, in a body structure such as in Japanese National-Phase Publication No. 2005-537179, a vehicle outer wall face is configured by an integrated side outer panel of outer panels of respective framework members integrated together. With such a side outer panel, there is room for improvement in terms of moldability and in the selection of lightweight materials therefor.

An object of the present disclosure is to provide a vehicle side section structure in which moldability of a side outer panel is improved, and for which lightweight materials can be selected.

A vehicle side section structure of a first aspect includes plural framework members, side outer panels, a door opening, a side door, and a sealing member. The plural framework members are disposed in a vehicle side section and have closed cross-sections. The side outer panels are molded independently from the framework members, and cover the framework members from a vehicle width direction outer side. The door opening is configured by the plural framework members. The side door is provided at the door opening so as to be capable of opening and closing. The sealing member plugs a gap between the door opening and the side door. The side outer panels surround the door opening, and are configured from plural panels including an opening panel that bears elastic force from the sealing member when the side door is in a closed state.

The vehicle side section structure of the first aspect is applied to a vehicle with framework members configured, for example, by a rocker, a front pillar, a center pillar, a rear pillar, and a roof side rail. In this vehicle side section structure, a front side door opening, this being a door opening corresponding to a front side door, is for example formed by the rocker, the front pillar, the roof side rail, and the center pillar. Further, a rear side door opening, this being a door opening corresponding to a rear side door, is for example formed by the rocker, the center pillar, the roof side rail, and the rear pillar. A vehicle width direction outer section of the plural framework members is covered by the side outer panels that are molded independently from the framework members and is configured from the plural panels. Herein, "molded independently" means being formed by a separate member to the framework members. The side outer panels include the opening panel that surrounds the door openings. The opening panel is formed so as to maintain the elastic force of sealing members interposed between the opening panel and the side doors corresponding to the door openings when the side doors are in a closed state.

With the vehicle side section structure of the first aspect, the opening panel has a complex shape that corresponds to the door opening, and is configured separately to other panels configuring the side outer panels. Namely, dividing the side outer panels into plural panels that are independent from the framework members enables moldability of the side outer panels to be improved, and enables lightweight materials to be selected therefor.

In a vehicle side section structure of a second aspect, the opening panel includes a weld for each of the framework members.

In the vehicle side section structure of the second aspect, the opening panel is fixed to the framework members using welding and not by components such as bolts or rivets. Such a vehicle side section structure enables vehicle weight to be reduced and enables manufacturing costs to be reduced.

In a vehicle side section structure of a third aspect, the opening panel includes a contact face that is contacted by the sealing member, and a bead between the contact face and each weld.

A "bead" is a projection formed by, for example, pressing and bending a sheet configuring the opening panel. In the vehicle side section structure of the third aspect, providing the bead between the contact face contacted by the sealing member and each weld enables surface accuracy of the contact face to be ensured since deformation of the opening panel due to heat from welding is absorbed by the bead.

In a vehicle side section structure of a fourth aspect, an outer edge of the opening panel is provided at a face at a vehicle width direction outer side of the framework members, or at a face at a side of the side door.

Herein, "a face at a side of a side door" means an inner wall face of a door opening, this being an inner edge of the door opening. In the vehicle side section structure of the fourth aspect, the opening panel does not cover so as to encase the framework members. Namely, since a complex drawing process is not needed for the outer edges of the opening panel in order to cover so as to encase the framework members, the moldability of the side outer panels are improved, and lightweight materials can be selected therefor. Further, since there is a reduction in portions of panels that overlap between the opening panel and the framework members, a reduction in weight of the vehicle body can be achieved.

In a vehicle side section structure of a fifth aspect, the framework members include a roof side rail, and the side outer panels include a rail garnish that covers the roof side rail.

In the vehicle side section structure of the fifth aspect, in addition to the opening panel, the side outer panels include the rail garnish that covers the roof side rail, this being a framework member. In this vehicle side section structure, due to the panels being provided by functional and styling units, such as roof side rail embellishment, the exterior panel color of the vehicle body can be easily painted different colors.

In a vehicle side section structure of a sixth aspect, the framework members include a rear pillar, and the side outer panels include a quarter panel that covers a vehicle width direction outer section disposed at a rear of the vehicle and including the rear pillar.

In the vehicle side section structure of the sixth aspect, in addition to the opening panel, the side outer panels include the quarter panel that covers the vehicle width direction outer section disposed at a rear of the vehicle and including the rear pillar, this being a framework member. In this vehicle side section structure, due to the panels being provided by functional and styling units, such forming an outer wall face at the vehicle rear, the exterior panel color of the vehicle body can be easily painted different colors.

The present disclosure improves moldability of side outer panels, and enables lightweight materials to be selected therefor.

BRIEF DESCRIPTION OF THE DRAWINGS

Exemplary embodiments of the present disclosure will be described in detail based on the following figures, wherein.

DETAILED DESCRIPTION

Figure 1:
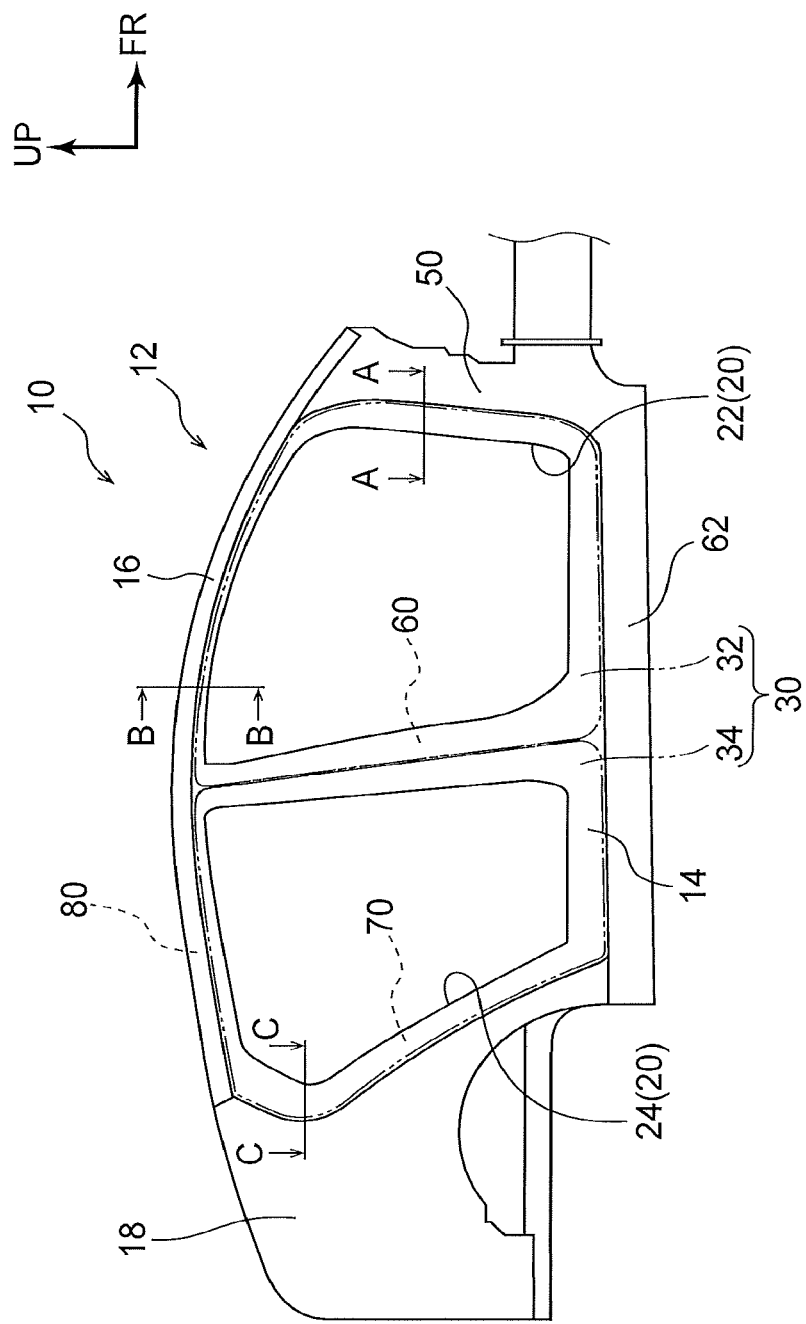
FIG. 1 is a side view diagram from the right of a vehicle side section structure according to exemplary embodiments herein, illustrating side outer panels fixed to a vehicle body.

Explanation follows regarding a vehicle side section structure 10 according to exemplary embodiments of the present disclosure, with reference to FIG. 1 to FIG. 8. Note that in the drawings, the arrow FR indicates a vehicle front, the arrow UP indicates a vehicle upper side, and the arrow OUT indicates a vehicle width direction outer side. Note that since the front section of the vehicle is basically configured with left-right symmetry, the vehicle right side will be illustrated and explained.

First Exemplary Embodiment

Explanation follows regarding a vehicle side section structure 10 according to the first exemplary embodiment, with reference to FIG. 1 to FIG. 5.

Basic Configuration of Vehicle Side Section Structure

Figure 2:
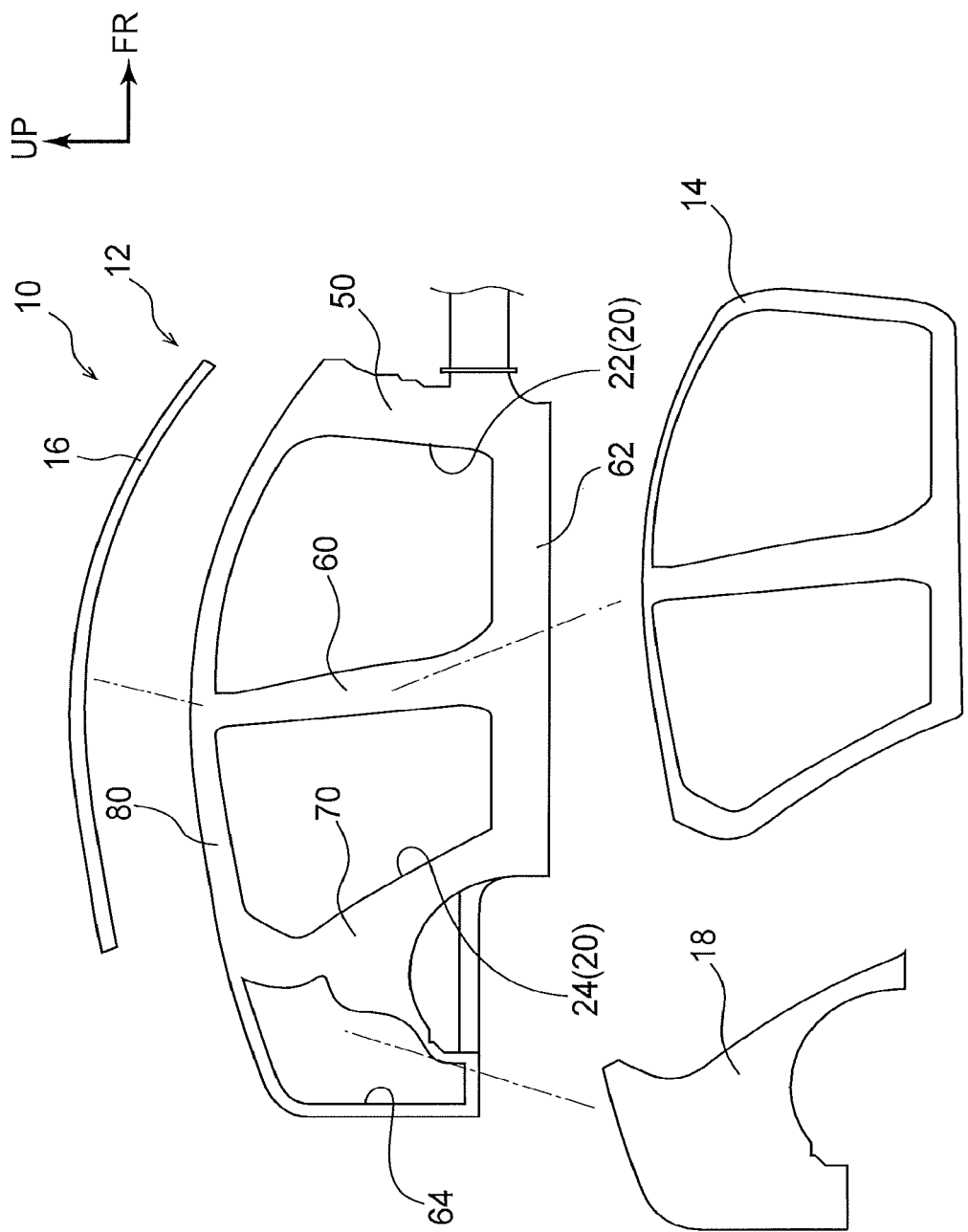
FIG. 2 is a side view diagram from the right of a vehicle side section structure according to exemplary embodiments herein, illustrating side outer panels prior to being fixed to a vehicle body.

As illustrated in FIG. 1 and FIG. 2, a rocker 62 extends along a vehicle front-rear direction at a lower section of a vehicle width direction outer side of a vehicle (vehicle body) 12 to which the vehicle side section structure 10 according to the first exemplary embodiment has been applied. A front pillar 50 extends upward from a front end of the rocker 62. A center pillar 60 extends upward from a vehicle front-rear direction central portion of the rocker 62. A rear pillar 70 extends upward from a rear end of the rocker 62. An upper end of the front pillar 50, an upper end of the center pillar 60, and an upper end of the rear pillar 70 are each joined to a roof side rail 80 that extends along the vehicle front-rear direction. The rocker 62, the front pillar 50, the center pillar 60, the rear pillar 70, and the roof side rail 80 are each made of metal, and form framework members with closed cross-sections.

The rocker 62, the front pillar 50, the roof side rail 80, and the center pillar 60 form a substantially rectangular front side door opening 22 in side view along the vehicle width direction. The rocker 62, the center pillar 60, the roof side rail 80, and the rear pillar 70 form a substantially rectangular rear side door opening 24 in side view along the vehicle width direction. The front side door opening 22 and the rear side door opening 24 are examples of a door opening 20.

Figure 3:
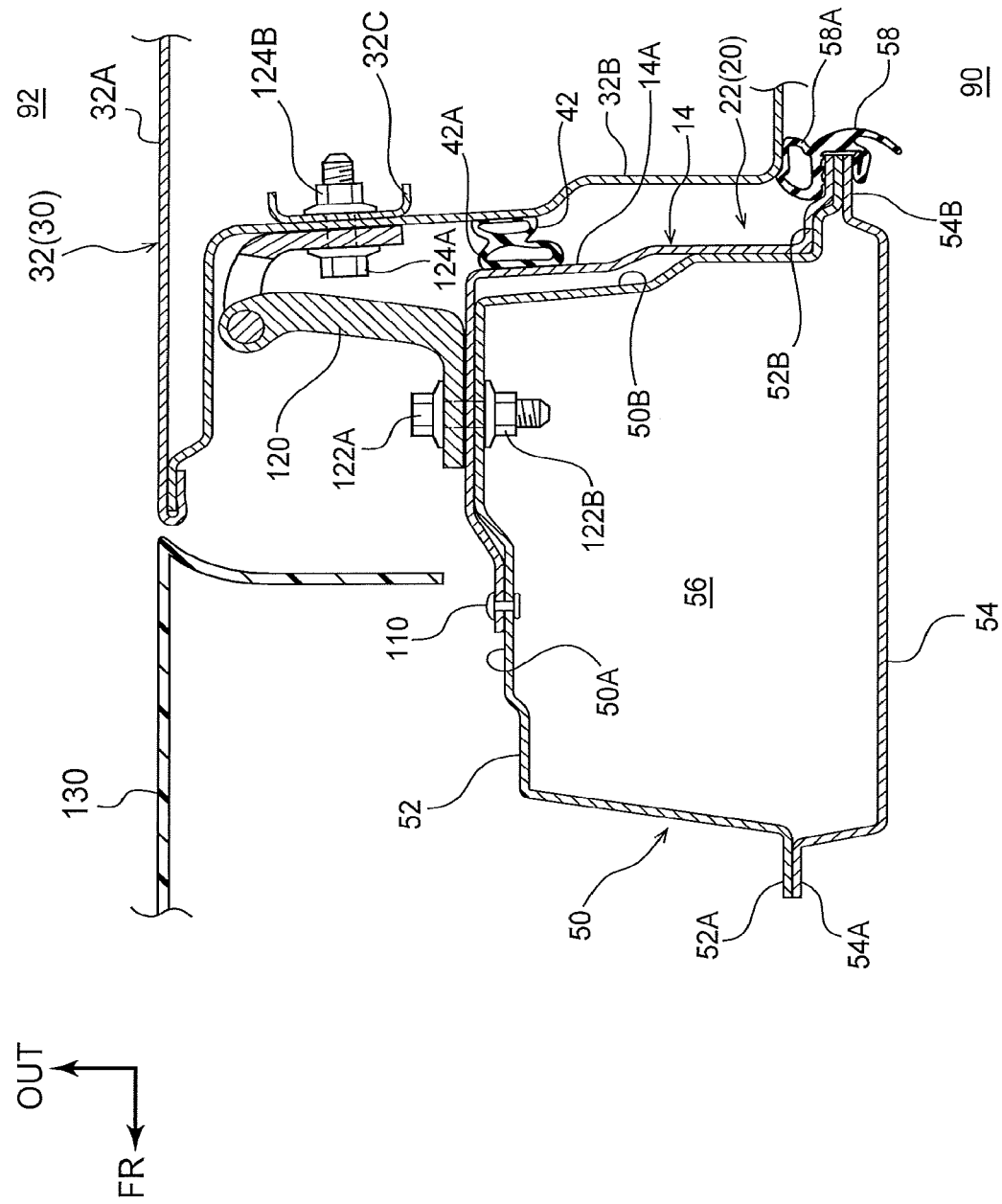
FIG. 3 illustrates a vehicle side section structure according to a first exemplary embodiment in cross-section around a front pillar (a cross-section along line A-A in FIG. 1)
Figure 4:
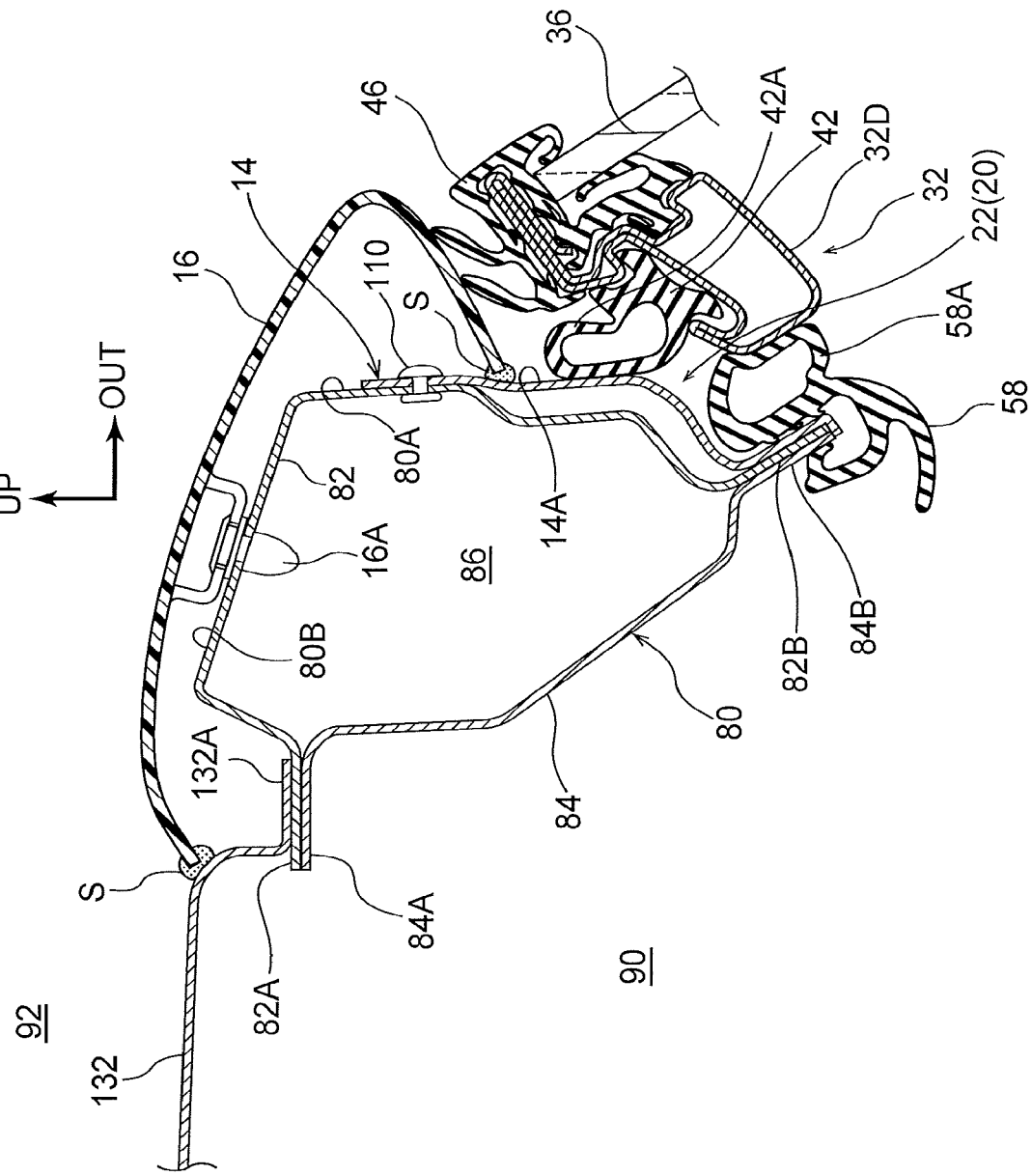
FIG. 4 illustrates a vehicle side section structure according to the first exemplary embodiment in cross-section around a roof side rail (a cross-section along line B-B in FIG. 1)
Figure 5:
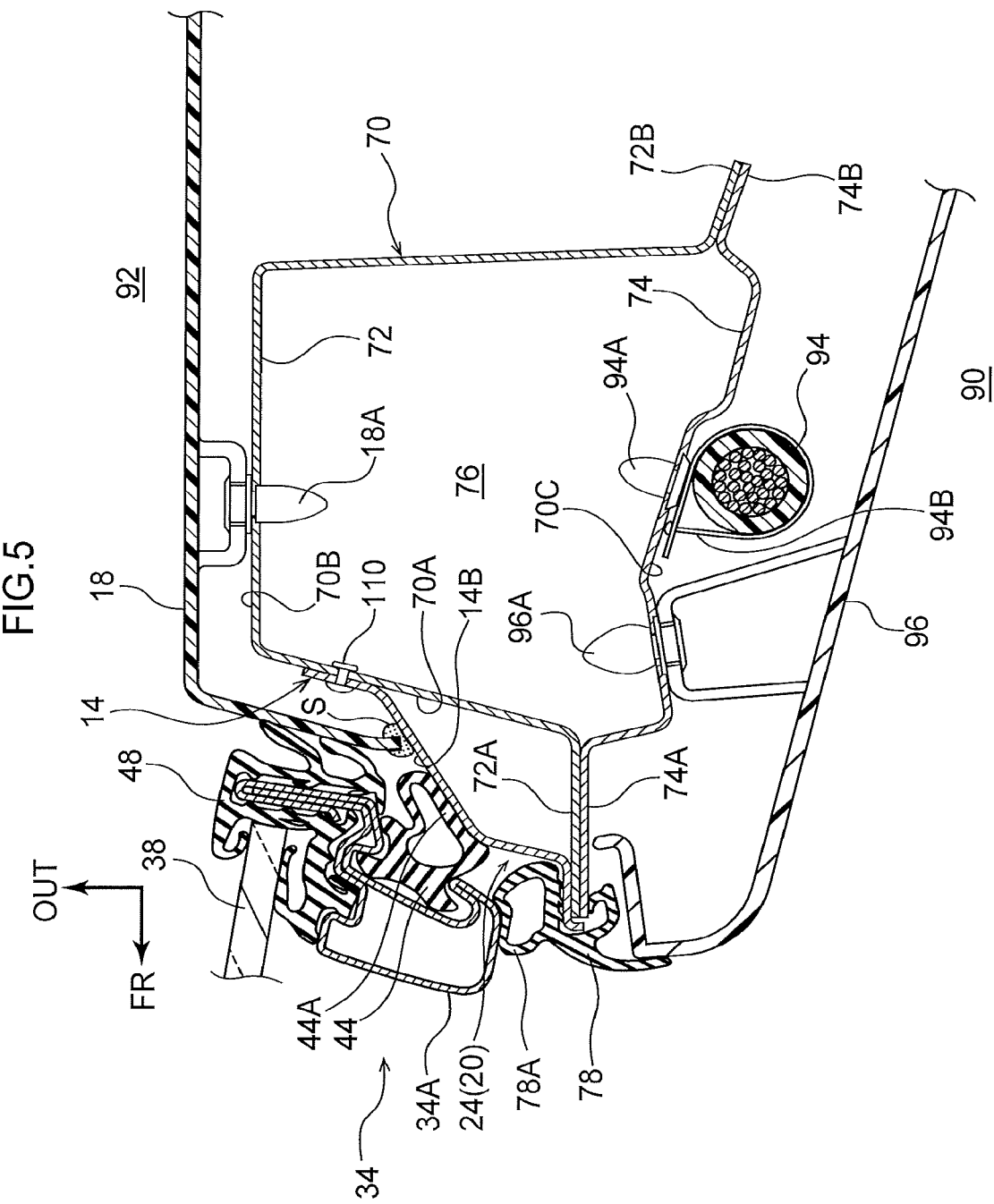
FIG. 5 illustrates a vehicle side section structure according to the first exemplary embodiment in cross-section around a rear pillar (a cross-section along line C-C in FIG. 1)

Each of the door openings 20 is provided with a side door 30 that can be opened and closed. Specifically, a front side door 32 and a rear side door 34 are respectively provided at the front side door opening 22 and the rear side door opening 24 so as to be capable of opening and closing. In each of the door openings 20, when the corresponding side door 30 is closed, a vehicle interior 90 is partitioned from a vehicle exterior 92 (see FIG. 3 to FIG. 5). Note that as illustrated in FIG. 3 and FIG. 4, a weather strip 42, serving as a sealing member, is provided to the front side door 32 so as to encircle the front side door 32. A weather strip 58, serving as a sealing member, is also provided to the front side door opening 22 so as to run along an inner edge of the front side door opening 22. As illustrated in FIG. 5, a weather strip 44, serving as a sealing member, is provided to the rear side door 34 so as to encircle an outer edge of the rear side door 34. Further, a weather strip 78, serving as a sealing member, is provided to the rear side door opening 24 so as to run along an inner edge of the rear side door opening 24.

As illustrated in FIG. 1 and FIG. 2, in the vehicle side section structure 10 of the present exemplary embodiment, the rocker 62, the front pillar 50, the center pillar 60, the rear pillar 70, and the roof side rail 80, which are framework members, are covered by plural side outer panels. Specifically, the vehicle side section structure 10 includes an opening panel 14, a rail garnish 16, and a quarter panel 18, each of which is a side outer panel.

The opening panel 14 is a panel that surrounds the front side door opening 22 and the rear side door opening 24, these being the door openings 20. The opening panel 14 is molded independently from the rocker 62, the front pillar 50, the center pillar 60, the rear pillar 70, and the roof side rail 80 configuring the door openings 20. In detail, the opening panel 14 is molded by pressing a sheet of metal into a shape that follows each of the door openings 20. In a closed state of the side doors 30, the weather strip 42 and the weather strip 44 respectively provided to the side doors 30 contact the opening panel 14 (see FIG. 3 to FIG. 5).

The rail garnish 16 is a member that covers the roof side rail 80. The rail garnish 16 is a panel made of resin molded independently from the roof side rail 80.

The quarter panel 18 is a member that covers a vehicle width direction outer section disposed at a rear of the vehicle and including the rear pillar 70. The quarter panel 18 is a panel that covers the rear pillar 70 and the vehicle upper side (for example, the opening 64 in FIG. 2) of a rear tire (not illustrated in the drawings), and is a panel made of resin that extends along the vehicle front-rear direction.

Vehicle Side Section Structure Cross-Section Structure

Explanation follows regarding the cross-section structure of the vehicle side section structure 10 of the present exemplary embodiment.

Front Pillar

FIG. 3 is a cross-section (a cross-section along line A-A in FIG. 1) of an area around the front pillar 50. As illustrated in FIG. 3, the front pillar 50 is configured by a front pillar outer panel 52 at the vehicle width direction outer side and a front pillar inner panel 54 at the vehicle width direction inner side. The front pillar outer panel 52 is formed with a hat shape that is open toward the vehicle width direction inner side as viewed in cross-section. A flange 52A extending toward the vehicle front is formed to the vehicle front side of the front pillar outer panel 52, and a flange 52B extending toward the vehicle rear is formed to the vehicle rear side of the front pillar outer panel 52. The front pillar inner panel 54 is formed with a hat shape that is open toward the vehicle width direction outer side as viewed in cross-section. A flange 54A extending toward the vehicle front is formed to the vehicle front side of the front pillar inner panel 54, and a flange 54B extending toward the vehicle rear is formed to the vehicle rear side of the front pillar inner panel 54. The flange 52A and the flange 54A are fixed together using spot welding, and the flange 52B and the flange 54B are fixed together using spot welding. The front pillar outer panel 52 and the front pillar inner panel 54 are thus fixed together, forming the front pillar 50 with a closed cross-section 56.

The opening panel 14 is fixed to the front pillar 50 from an outer wall face 50A on the vehicle width direction outer side of the front pillar 50 to a rear wall face 50B at the vehicle rear side of the front pillar 50. In detail, the vehicle front side of the opening panel 14 is fixed to the outer wall face 50A using rivets 110 and adhesive, and the vehicle rear side of the opening panel 14 is fixed to the rear wall face 50B using adhesive.

The weather strip 58 is provided at a vehicle rear side end of the front pillar 50, at a portion where the opening panel 14, the flange 52B, and flange 54B are overlapped. The weather strip 58 includes a hollow sealing portion 58A that has a hollow cross-section and is bulged toward the vehicle width direction outer side.

The front side door 32 is fixed, via a door hinge 120, to a portion of the front pillar 50 where the front pillar 50 (front pillar outer panel 52) overlaps with the opening panel 14. The front side door 32 is configured so as to be capable of opening and closing. The front side door 32 includes a substantially flat sheet shaped door outer panel 32A made of metal, and a substantially hat shaped door inner panel 32B made of metal. Note that a front fender 130 made of resin is provided extending along the vehicle front-rear direction at the vehicle front of the door outer panel 32A. A continuous styling face is formed by the door outer panel 32A and the front fender 130 at the vehicle width direction outer side of the vehicle body 12. The weather strip 42 is provided to the door inner panel 32B so as to encircle the outer edge of the front side door 32. The side of the weather strip 42 that faces the front pillar 50 is provided with a hollow sealing portion 42A that has a hollow cross-section and is bulged toward the front pillar 50.

At the side of the front side door 32, one end of the door hinge 120 is fixed to the door inner panel 32B and a hinge retainer 32C by bolts 124A and nuts 124B. At the side of the front pillar 50, the other end of the door hinge 120 is fixed to a surface (a face on a vehicle width direction outer side) of the opening panel 14 covering the outer wall face 50A by bolts 122A and nuts 122B. The front side door 32 is thus fixed to the front pillar 50 via the door hinge 120 so as to be capable of opening and closing. Namely, the front side door 32 is able to open and close off the front side door opening 22.

Note that a non-illustrated latch mechanism is provided at the vehicle rear side of the front side door 32. This latch mechanism engages with a non-illustrated striker provided to the center pillar 60 (see FIG. 2) to put the front side door 32 in closed state. When the front side door 32 adopts a closed state, the hollow sealing portion 58A of the weather strip 58 contacts the door inner panel 32B, and the hollow sealing portion 42A of the weather strip 42 contacts a contact face 14A of the opening panel 14. In the closed state of the front side door 32, any gap between the front side door opening 22 (opening panel 14) and the front side door 32 is thereby plugged, and the airtightness of the vehicle interior 90 maintained.

Roof Side Rail

FIG. 4 is a cross-section (a cross-section along line B-B in FIG. 1) of the area around the roof side rail 80. As illustrated in FIG. 4, the roof side rail 80 is configured by a rail outer panel 82 at the vehicle upper side and a rail inner panel 84 at the vehicle lower side. The rail outer panel 82 is formed with a hat shape that is open toward the vehicle lower side as viewed in cross-section. A flange 82A extending toward the vehicle width direction inner side is formed to the vehicle width direction inner side of the rail outer panel 82, and a flange 82B extending toward the vehicle lower side is formed to the vehicle lower side of the rail outer panel 82. The rail inner panel 84 is substantially sheet shaped as viewed in cross-section. A flange 84A extending toward the vehicle width direction inner side is formed to the vehicle width direction inner side of the rail inner panel 84, and a flange 84B extending toward the vehicle lower side is formed to the vehicle lower side of the rail inner panel 84. The flange 82A and the flange 84A are fixed together using spot welding, and the flange 82B and the flange 84B are fixed together using spot welding. The rail outer panel 82 and the rail inner panel 84 are thus fixed together, forming the roof side rail 80 with a closed cross-section 86.

Note that at the vehicle width direction inner side of the roof side rail 80, the flange 82A and the flange 84A are fixed to a flange 132A formed at the vehicle width direction outer side of a roof panel 132 using spot welding.

The opening panel 14 is fixed to an outer wall face 80A at the vehicle width direction outer side of the roof side rail 80. In detail, the vehicle upper side of the opening panel 14 is fixed to the outer wall face 80A using rivets 110 and adhesive. The vehicle lower side of the opening panel 14 is fixed to the flange 82B using adhesive.

The rail garnish 16 is fixed to an upper wall face 80B at the vehicle upper side of the roof side rail 80. In detail, a clip 16A that projects toward the vehicle lower side is formed to the rail garnish 16, and the rail garnish 16 is fixed to the roof side rail 80 by fitting the clip 16A into a non-illustrated attachment hole formed in the upper wall face 80B. The roof side rail 80 is thus covered by the rail garnish 16. A fixing portion (flange 132A) of the roof panel 132 and a fixing portion (rivets 110) at the vehicle upper side of the opening panel 14 are then shielded by the rail garnish 16. Note that a sealant S is applied to portions of the rail garnish 16 and the roof panel 132 that touch or are in close proximity to one another, and to portions of the rail garnish 16 and the opening panel 14 that touch or are in close proximity to one another.

The weather strip 58 is provided at a vehicle lower side end of the roof side rail 80, at a portion where the opening panel 14 and the flange 82B and flange 84B are overlapped. The weather strip 58 is formed extending continuously from the front pillar 50.

As described above, the front side door 32 is fixed to the front pillar 50 via the door hinge 120 so as to be capable of opening and closing. The front side door 32 includes a door frame 32D forming a window frame for side door glass 36. The door frame 32D is provided with a glass run 46 that guides the side door glass 36 when raised or lowered in the vehicle vertical direction. The weather strip 42 is also provided to the door frame 32D so as to encircle the outer edge of the front side door 32. The weather strip 42 is formed extending contiguously from the front pillar 50, and the side of the weather strip 42 that faces the roof side rail 80 is provided with the hollow sealing portion 42A bulged toward the roof side rail 80.

When the front side door 32 adopts a closed state, the hollow sealing portion 58A of the weather strip 58 contacts the door frame 32D, and the hollow sealing portion 42A of the weather strip 42 contacts the contact face 14A of the opening panel 14. In the closed state of the front side door 32, any gap between the front side door opening 22 (opening panel 14) and the front side door 32 is thereby plugged, and the airtightness of the vehicle interior 90 is maintained.

Rear Pillar

FIG. 5 is a cross-section (a cross-section along line C-C in FIG. 1) of the area around the rear pillar 70. As illustrated in FIG. 5, the rear pillar 70 is configured by a rear pillar outer panel 72 at the vehicle width direction outer side and a rear pillar inner panel 74 at the vehicle width direction inner side. The rear pillar outer panel 72 is formed with a hat shape that is open toward the vehicle width direction inner side as viewed in cross-section. A flange 72A extending toward the vehicle front is formed to the vehicle front side of the rear pillar outer panel 72, and a flange 72B extending toward the vehicle rear is formed to the vehicle rear side of the rear pillar outer panel 72. The rear pillar inner panel 74 is formed with a hat shape that is open toward the vehicle width direction outer side as viewed in cross-section. A flange 74A extending toward the vehicle front is formed to the vehicle front side of the rear pillar inner panel 74, and a flange 74B extending toward the vehicle rear is formed to the vehicle rear side of the rear pillar inner panel 74. The flange 72A and the flange 74A are fixed together using spot welding, and the flange 72B and the flange 74B are fixed together using spot welding. The rear pillar outer panel 72 and the rear pillar inner panel 74 are thus fixed together, forming the rear pillar 70 with a closed cross-section 76.

The opening panel 14 is fixed to the rear pillar 70 from a front wall face 70A on the vehicle front side of the rear pillar 70 to the flange 72A. In detail, the vehicle front side of the opening panel 14 is fixed to the flange 72A using adhesive, and the vehicle rear side of the opening panel 14 is fixed to the front wall face 70A using rivets 110 and adhesive.

The quarter panel 18 is fixed to an outer wall face 70B at the vehicle width direction outer side of the rear pillar 70. In detail, the quarter panel 18 is formed with a clip 18A that projects toward the vehicle width direction inner side, and the quarter panel 18 is fixed to the rear pillar 70 by fitting the clip 18A into a non-illustrated attachment hole formed in the outer wall face 70B. A vehicle width direction outer section at a rear of the vehicle and including the rear pillar 70 is thus covered by the quarter panel 18. A fixing portion (rivets 110) at the vehicle width direction outer side of the opening panel 14 and the opening 64 toward the vehicle rear (see FIG. 2) are then shielded by the quarter panel 18. Note that a sealant S is applied to portions of the quarter panel 18 and the opening panel 14 that touch or are in close proximity to one another.

A wire harness 94 and a quarter pillar garnish 96 are fixed to an inner wall face 70C at the vehicle width direction inner side of the rear pillar 70. In detail, the wire harness 94 is retained using a clamp 94B, which is formed with a clip 94A that projects toward the vehicle width direction outer side from the clamp 94B, and the wire harness 94 is fixed to the rear pillar 70 by fitting the clip 94A into a non-illustrated attachment hole formed in the inner wall face 70C. The quarter pillar garnish 96 is also formed with a clip 96A that projects toward the vehicle width direction outer side, and the quarter pillar garnish 96 is fixed to the rear pillar 70 by fitting the clip 96A into a non-illustrated attachment hole formed in the inner wall face 70C. The vehicle interior 90 side of the rear pillar 70 is thus covered by the quarter pillar garnish 96. The rear pillar 70 and the wire harness 94 are then shielded by the quarter pillar garnish 96.

The weather strip 78 is provided at a vehicle front side end of the rear pillar 70, at a portion where the opening panel 14 and the flange 72A and flange 74A are overlapped. The weather strip 78 includes a hollow sealing portion 78A that has a hollow cross-section and is bulged toward the vehicle width direction outer side.

The rear side door 34 is fixed to the rear pillar 70 via a non-illustrated door hinge provided to the center pillar 60 so as to be capable of opening and closing. The rear side door 34 includes a door frame 34A forming a window frame for side door glass 38. The door frame 34A is provided with a glass run 48 that guides the side door glass 38 when raised or lowered in the vehicle vertical direction. The weather strip 44 is also provided to the door frame 34A so as to encircle the outer edge of the rear side door 34. The side of the weather strip 44 that faces the rear pillar 70 is provided with the hollow sealing portion 44A with the hollow cross-section bulged toward the rear pillar 70.

When the rear side door 34 adopts a closed state, the hollow sealing portion 78A of the weather strip 78 contacts the door frame 34A, and the hollow sealing portion 44A of the weather strip 44 contacts a contact face 14B of the opening panel 14. In the closed state of the rear side door 34, any gap between the rear side door opening 24 (opening panel 14) and the rear side door 34 is thereby plugged, and the airtightness of the vehicle interior 90 is maintained.

Additional Elements

Although not illustrated in the drawings, the opening panel 14 is fixed to the center pillar 60 and the rocker 62 using rivets and adhesive. A non-illustrated door hinge on the center pillar 60 is fixed to a surface (a face on the vehicle width direction outer side) of the opening panel 14.

Summary of First Exemplary Embodiment

As described above, in the vehicle side section structure 10 of the present exemplary embodiment, the rocker 62, the front pillar 50, the center pillar 60, the rear pillar 70, and the roof side rail 80, which are framework members, are covered by plural side outer panels. For example, the front side door opening 22 and the rear side door opening 24 configured by framework members are surrounded by the opening panel 14, which is a distinct member from these framework members. In detail, portions of the rocker 62, the front pillar 50, the roof side rail 80, and the center pillar 60 near the front side door 32 are covered by the opening panel 14. Portions of the rocker 62, center pillar 60, roof side rail 80, and rear pillar 70 near the rear side door 34 are also covered by the opening panel 14. The roof side rail 80 is covered by the rail garnish 16, which is a distinct member from the roof side rail 80. A vehicle width direction outer section at a rear of the vehicle and including the rear pillar 70 is covered by the quarter panel 18, which is a distinct member from the rear pillar 70.

The vehicle side section structure 10 of the present exemplary embodiment thus configured has the following features and advantageous effects.

A first feature of the present exemplary embodiment is that the side outer panels covering the framework members from the vehicle width direction outer side are divided into the opening panel 14, the rail garnish 16, and the quarter panel 18. An integrated side outer panel configured from outer panels of respective framework members integrated together, as in the related art, must have a shape that corresponds to the shape of the framework members configuring a door opening and also corresponds to the outer wall face of the vehicle body. In particular, since the area around the door opening has a complex shape, it has hitherto been difficult to improve moldability when employing an integrated side outer panel of outer panels of respective framework members integrated together. In contrast thereto, with the present exemplary embodiment, moldability can be improved since at least the opening panel 14 is configured separately to the other panels. Further, in the present exemplary embodiment, due to this improved moldability, a metal material that is softer than steel, such as aluminum, or a resin material can be employed for the side outer panels. Namely, it is possible to select a more lightweight material therefor.

A second feature of the present exemplary embodiment is that the outer edge of the opening panel 14 is provided at a face on the vehicle width direction outer side of the framework members, or at a face at a side of the side door. In other words, the opening panel 14 does not cover so as to encase the framework members. For example, a vehicle front side outer edge of the opening panel 14 is provided on the outer wall face 50A of the front pillar 50, and the opening panel 14 does not cover so as to encase the front pillar 50. A vehicle upper side outer edge of the opening panel 14 is provided on the outer wall face 80A of the roof side rail 80, and the opening panel 14 does not cover so as to encase the roof side rail 80. A vehicle rear side outer edge of the opening panel 14 is provided on the front wall face 70A of the rear pillar 70, and the opening panel 14 does not cover so as to encase the rear pillar 70. In the present exemplary embodiment, the opening panel 14 thus does not have a shape to encase the framework members, in other words, is molded in a hat shape open toward the vehicle width direction inner side as viewed in cross-section. Namely, since the opening panel 14 of the present exemplary embodiment does not need a complex drawing process at the outer edges, the moldability can be improved. Further, in the present exemplary embodiment, due to this improved moldability, it is possible to select a more lightweight material as described above. Further, in the present exemplary embodiment, the opening panel 14 only covers a portion of the framework members. Namely, since there is a reduction in portions of panels that overlap between the opening panel 14 and the framework members, a reduction in weight of the vehicle body 12 can be achieved.

A third feature of the present exemplary embodiment is that the side outer panel is divided into functional and styling units. For example, the opening panel 14 is configured as a section to contact the weather strip 42 and the weather strip 44, serving as sealing members, provided to the side doors 30. The opening panel 14 is also configured as a section to which the weather strip 58 and the weather strip 78, serving as sealing members, are fixed. As a result, the opening panel 14 has the function of not only forming the styling face of the door opening 20, but also of maintaining the elastic force of the weather strip 42, the weather strip 44, the weather strip 58, and the weather strip 78. The rail garnish 16 has the function of not only forming a styling face near the roof side rail 80, but also of embellishing the roof side rail 80. The quarter panel 18 has the function of forming a styling face near the rear pillar 70, and of configuring an outer wall face at the vehicle rear. In cases in which the side outer panel is not divided, an inefficient process such as masking is necessary when painting the exterior panel color of the vehicle body in different colors. In contrast thereto, in the present exemplary embodiment, the panels are provided by functional and styling units, enabling the exterior panel color of the vehicle body 12 to be easily painted different colors.

Second Exemplary Embodiment

Figure 6:
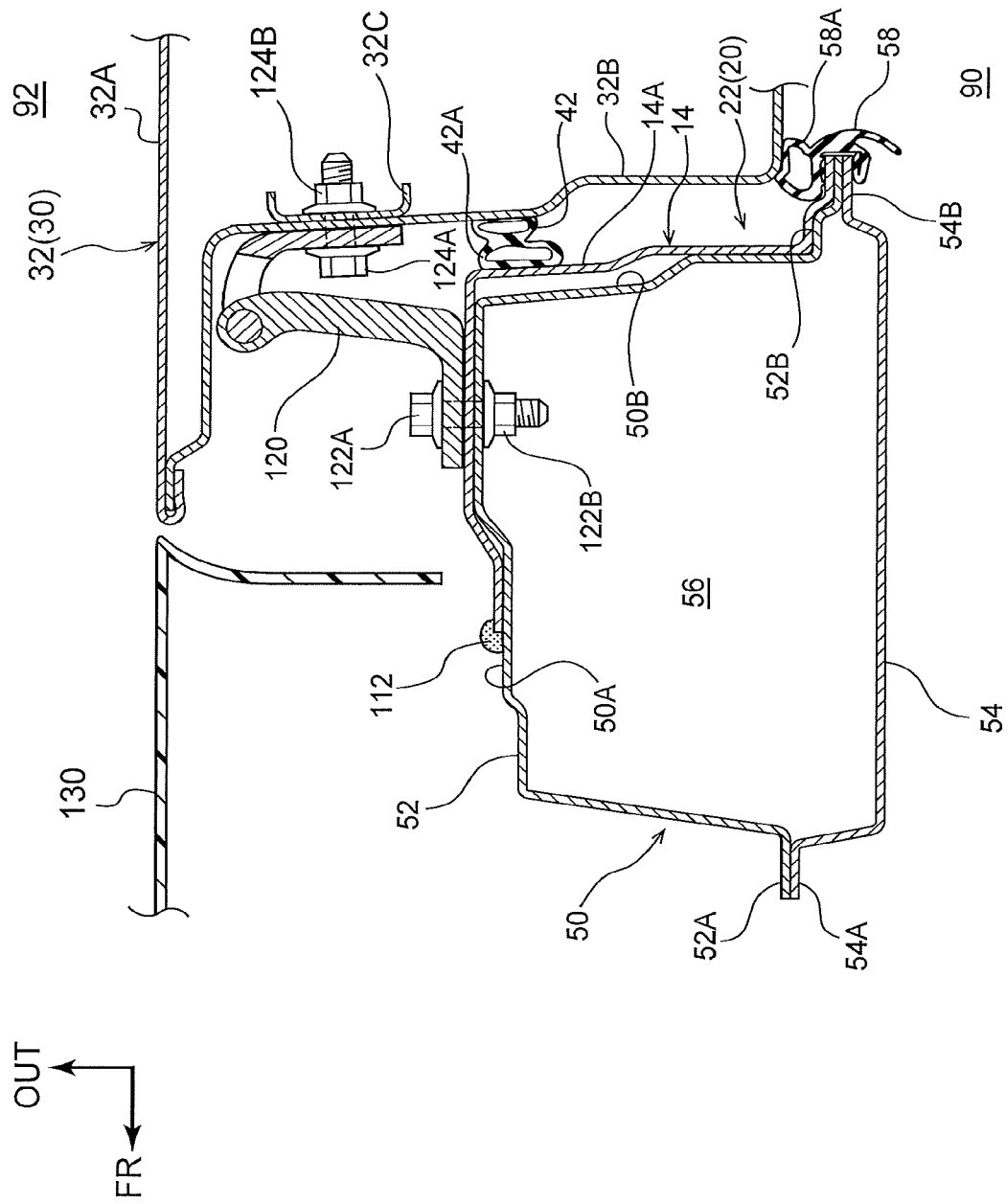
FIG. 6 illustrates a vehicle side section structure according to a second exemplary embodiment in cross-section around a front pillar (a cross-section along line A-A in FIG. 1)
Figure 7:
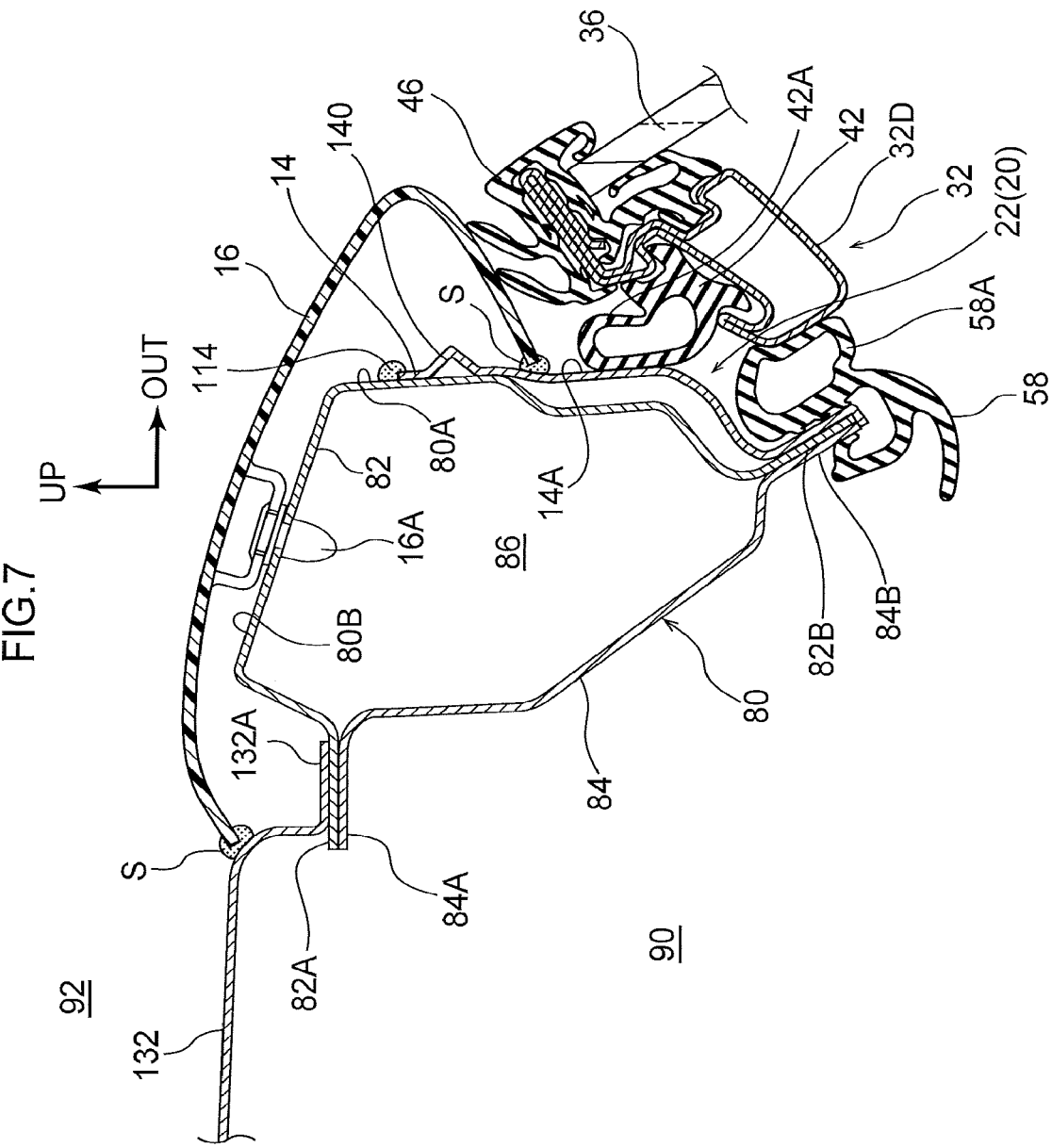
FIG. 7 illustrates a vehicle side section structure according to the second exemplary embodiment in cross-section around a roof side rail (a cross-section along line B-B in FIG. 1)
Figure 8:
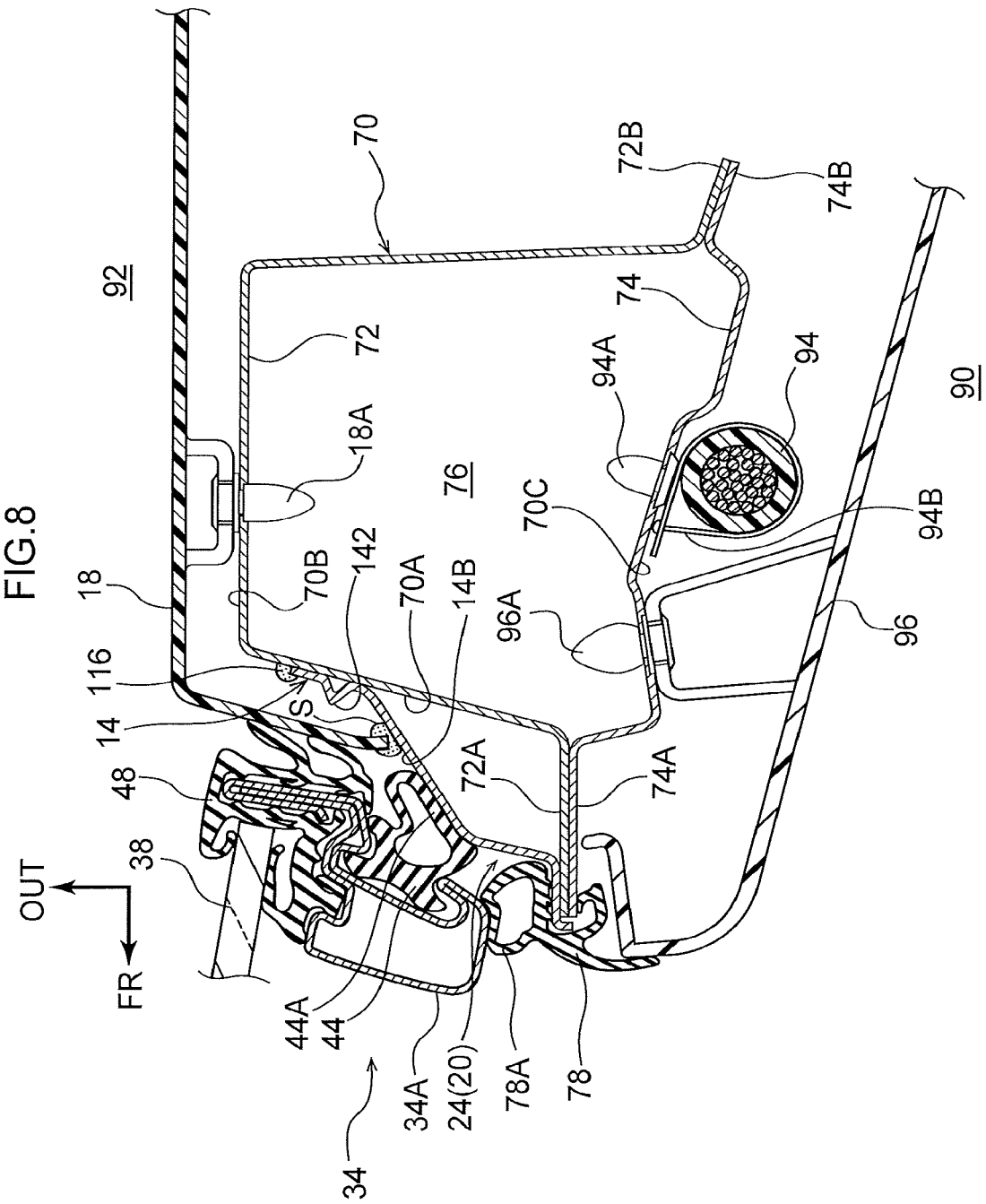
FIG. 8 illustrates a vehicle side section structure according to the second exemplary embodiment in cross-section around a rear pillar (a cross-section along line C-C in FIG. 1).

Explanation follows regarding a vehicle side section structure 10A according to a second exemplary embodiment, with reference to FIG. 6 to FIG. 8. Note that configuration that is the same as that for the vehicle side section structure 10 according to the first exemplary embodiment is appended with the same reference signs. The following explanation focuses on points that differ from the first exemplary embodiment.

Front Pillar

FIG. 6 is a cross-section (a cross-section along line A-A in FIG. 1) of the area around the front pillar 50. In the present exemplary embodiment, the structure for fixing the opening panel 14 to the front pillar 50 differs from that of the first exemplary embodiment. Specifically, as illustrated in FIG. 6, the vehicle front side of the opening panel 14 is fixed to the outer wall face 50A of the front pillar 50 using arc welding, and a vehicle rear side of the opening panel 14 is fixed to the rear wall face 50B of the front pillar 50 using adhesive. Namely, in the present exemplary embodiment, welds 112 are formed on the outer wall face 50A at the vehicle front side outer edge of the opening panel 14. In the present exemplary embodiment, plural welds 112 approximately 50 mm long are intermittently provided at the vehicle front side outer edge of the opening panel 14.

Roof Side Rail

FIG. 7 is a cross-section (a cross-section along line B-B in FIG. 1) of the area around the roof side rail 80. In the present exemplary embodiment, the structure for fixing the opening panel 14 to the roof side rail 80 differs from that of the first exemplary embodiment. Specifically, as illustrated in FIG. 7, the vehicle upper side of the opening panel 14 is fixed to the outer wall face 80A of the roof side rail 80 using arc welding, and the vehicle lower side of the opening panel 14 is fixed to the flange 82B of the roof side rail 80 using adhesive. Namely, in the present exemplary embodiment, welds 114 are formed on the outer wall face 80A at the vehicle upper side outer edge of the opening panel 14. In the present exemplary embodiment, plural welds 114 approximately 50 mm long each are intermittently provided at the vehicle upper side outer edge of the opening panel 14.

The opening panel 14 of the present exemplary embodiment includes the contact face 14A contacted by the hollow sealing portion 42A of the weather strip 42, and further includes an elongated bead 140 that has a peaked shape in cross-section between the contact face 14A and the welds 114. The bead 140 projects toward the vehicle width direction outer side, and is formed running along the vehicle upper side outer edge of the opening panel 14. The bead 140 is formed by, for example, pressing and bending a sheet configuring the opening panel 14.

Rear Pillar

FIG. 8 is a cross-section (a cross-section along line C-C in FIG. 1) of the area around the rear pillar 70. In the present exemplary embodiment, the structure for fixing the opening panel 14 to the rear pillar 70 differs from that of the first exemplary embodiment. Specifically, as illustrated in FIG. 8, the vehicle front side of the opening panel 14 is fixed to the flange 72A of the rear pillar 70 using adhesive, and the vehicle rear side of the opening panel 14 is fixed to the front wall face 70A of the rear pillar 70 using arc welding. Namely, in the present exemplary embodiment, welds 116 are formed on the front wall face 70A at outer edges of the opening panel 14, at the vehicle rear side and the vehicle width direction outside of the opening panel 14. In the present exemplary embodiment, plural welds 116 approximately 50 mm long are intermittently provided to the outer edges of the opening panel 14, at the vehicle rear side outer edge and the vehicle width direction outside thereof.

The opening panel 14 of the present exemplary embodiment includes the contact face 14B contacted by the hollow sealing portion 44A of the weather strip 44, and further includes an elongated bead 142 that has a peaked shape in cross-section between the contact face 14B and the welds 116. The bead 142 projects toward the vehicle front side, and is formed running along the outer edges of the opening panel 14, at the vehicle rear side and the vehicle width direction outside of the opening panel 14. The bead 142 is formed by, for example, pressing and bending a sheet configuring the opening panel 14.

Summary of Second Exemplary Embodiment

In addition to the features and advantageous effects of the first exemplary embodiment, the vehicle side section structure 10A of the second exemplary embodiment also has the following features and advantageous effects.

A first feature of the present exemplary embodiment is that the opening panel 14 is fixed to the front pillar 50, the roof side rail 80, and the rear pillar 70 using welding. In the present exemplary embodiment, fixing the opening panel 14 using welding enables the weight of the vehicle body 12 to be reduced and enables component procurement costs to be reduced, compared to cases in which the opening panel 14 is fixed using components such as bolts or rivets. Further, the present exemplary embodiment enables manufacturing costs to be reduced and enables shorter manufacturing lead times since fixing of the opening panel 14 is able to be automated using existing equipment. Further, in the present exemplary embodiment, since a jig is employed during welding, it is possible to increase the positional accuracy of the contact faces 14A, 14B on the vehicle body 12.

A second feature of the present exemplary embodiment is that the welding-fixed opening panel 14 includes the beads 140, 142. Specifically, the opening panel 14 of the present exemplary embodiment includes the contact face 14A contacted by the weather strip 42, and includes the elongated bead 140 between the contact face 14A and the welds 114. The opening panel 14 also includes the contact face 14B contacted by the weather strip 44, and includes the elongated bead 142 between the contact face 14B and the welds 116. The present exemplary embodiment thus enables the surface accuracy of the contact faces 14A, 14B to be ensured, since deformation of the opening panel 14 due to heat from arc welding is absorbed by the beads 140, 142.

Note that at the vehicle front side of the opening panel 14 of the present exemplary embodiment, the distance between the contact face 14A and the welds 112 is greater than both the distance between the contact face 14A and the welds 114 at the vehicle upper side of the opening panel 14, and the distance between the contact face 14B and the welds 116 at the vehicle rear side of the opening panel 14 (see FIG. 6 to FIG. 8). Further, the opening panel 14 of the present exemplary embodiment is formed with a portion bent at substantially a right angle between the welds 112 and the contact face 14A (see FIG. 6) in order to correspond to the shape of the front pillar 50. In the present exemplary embodiment, an elongated bead is not provided running along the vehicle front side outer edge of the opening panel 14. So long as the opening panel 14 has sufficient distance and the bent portion to absorb deformation due to heat, the surface accuracy of the contact face is able to be ensured without provided an elongated bead.

Supplementary Explanation

The first and second exemplary embodiments have the following secondary advantageous effects. Namely, in the exemplary embodiments, the side outer panels do not include members that configure framework members. In the case of an integrated side outer panel configured from outer panels of respective framework members integrated together, the side outer panel itself is part of the framework members, and the side outer panel has a partitioning function to section between the vehicle interior 90 and the vehicle exterior 92. In contrast thereto, in the exemplary embodiments, the side outer panels are molded independently from the framework members, and the partitioning function is performed by an inner panel at the vehicle width direction inner side (for example, the front pillar inner panel 54, the rear pillar inner panel 74). Namely, in the exemplary embodiments, the partitioning function to section between the vehicle interior 90 and the vehicle exterior 92 is moved from a side outer panel at the vehicle width direction outer side to an inner panel at the vehicle width direction inner side, enabling the side outer panels to be separate from the framework members. The exemplary embodiments thereby enable the external profile of the framework members to be reduced.

In the exemplary embodiments, although the side outer panels are divided into three, these being the opening panel 14, the rail garnish 16, and the quarter panel 18, this is merely one example, and the units of division and the locations of division may be freely set. For example, in the exemplary embodiments, the opening panel 14 and the rail garnish 16 may be molded as one, or the rail garnish 16 and the quarter panel 18 may be molded as one. Further, the opening panel 14 may for example be divided, with one for each door opening 20. Namely, the opening panel 14 of the exemplary embodiments may be further divided so as to provide an opening panel for the front side door opening 22 and an opening panel for the rear side door opening 24.

In the exemplary embodiments, although the opening panel 14 is made of metal, and the rail garnish 16 and the quarter panel 18 are made of resin, the material of the panels configuring the side outer panels are not limited thereto. The material of the panels may be freely chosen according to the strength required and moldability.

In the second exemplary embodiment, the plural welds 112 are intermittently provided at the vehicle front side outer edge of the opening panel 14, the plural welds 114 are intermittently provided at the vehicle upper side outer edge of the opening panel 14, and the plural welds 116 are intermittently provided at the outer edges of the opening panel 14, on the vehicle rear side and the vehicle width direction outside thereof. However, there is no limitation thereto, and the welds 112, 114, 116 may be provided running continuously so as to encircle the outer edge of the opening panel 14.

Further, although the opening panel 14 is fixed using arc welding in the second exemplary embodiment, there is no limitation thereto, and the opening panel 14 may be fixed using spot welding.

Although explanation has been given regarding exemplary embodiments of the present disclosure, the present disclosure is not limited to the above, and obviously various other modifications may be implemented within a range not departing from the spirit of the present disclosure.

What is claimed is:

1. A vehicle side section structure comprising:
   a plurality of framework members that are disposed in a vehicle side section and that have closed cross-sections;
   a door opening configured by the plurality of the framework members;
   side outer panels that are molded independently from the framework members, that surround the door opening, and that cover the framework members from a vehicle width direction outer side;
   a side door that is provided at the door opening configured to open and close; and
   a sealing member that plugs a gap between the door opening and the side door, wherein
   the side outer panels include an opening panel that bears elastic force from the sealing member when the side door is in a closed state,
   the opening panel includes a weld for each of the framework members, a contact face that is contacted by the sealing member, and a bead between the contact face and each weld, and
   the bead is configured to absorb heat produced by the weld.

2. The vehicle side section structure of claim 1, wherein an outer edge of the opening panel is provided at a face at a vehicle width direction outer side of the framework members, or at a face at a side of the side door.

3. The vehicle side section structure of claim 1, wherein:
   the framework members include a roof side rail; and
   the side outer panels include a rail garnish that covers the roof side rail.

4. The vehicle side section structure of claim 3, wherein the rail garnish covers a fixing portion between the roof side rail and the opening panel.

5. The vehicle side section structure of claim 1, wherein:
   the framework members include a rear pillar; and
   the side outer panels include a quarter panel that covers a vehicle width direction outer section disposed at a rear of the vehicle and including the rear pillar.

6. The vehicle side section structure of claim 5, wherein the quarter panel covers a fixing portion between the rear pillar and the opening panel.

7. The vehicle side section structure of claim 1, wherein the bead has a peaked shape in cross-section that projects toward the vehicle width direction outer side.

* * * * *